United States Patent [19]

Hughes

[11] Patent Number: 4,662,677
[45] Date of Patent: May 5, 1987

[54] SADDLE FOR BICYCLE USED IN PERFORMING FREESTYLE MANEUVERS

[75] Inventor: Bradley E. Hughes, Franklin Park, Ill.

[73] Assignee: Schwinn Bicycle Company, Chicago, Ill.

[21] Appl. No.: 866,231

[22] Filed: May 28, 1986

[51] Int. Cl.⁴ .............................................. A62J 1/00
[52] U.S. Cl. ................................ 297/195; 280/289 G
[58] Field of Search ............... 297/195; 280/261, 279, 280/289 G

[56] References Cited

U.S. PATENT DOCUMENTS

| | | | |
|---|---|---|---|
| 3,096,100 | 7/1963 | Clarke et al. | 297/195 X |
| 3,408,090 | 10/1968 | Fritz et al. | 297/195 X |
| 3,486,727 | 12/1969 | Timms | 297/195 X |
| 3,501,119 | 3/1970 | Rich, Jr. | 297/195 X |
| 3,961,810 | 6/1976 | Arico | 280/289 G X |
| 3,997,185 | 12/1976 | Parrilla | 280/289 G |

FOREIGN PATENT DOCUMENTS 9555 of 1899 United Kingdom .

OTHER PUBLICATIONS

Exhibit D–*Freestylin'* Magazine, Mar. 1986, p. 72.
Exhibit A–*Freestylin'* Magazine, May, 1986, pp. 16 and 17.
Exhibit B–*Freestylin'* Magazine, Jun., 1986, pp. 62 and 63.
Exhibit C–*BMX Action* Magazine, Mar., 1986, p. 41.

Primary Examiner—Peter A. Aschenbrenner
Attorney, Agent, or Firm—McCaleb, Lucas & Brugman

[57] ABSTRACT

A bicycle saddle to facilitate freestyle maneuvers. A protecting element comprising a roller assembly is supported in the rear portion and protrudes above the top surface of the saddle body to engage the pavement when the bike is in inverted position during freestyle maneuvers. This protects the saddle from scuffing damage and facilitates transition to and from the inverted position. Corrugations at opposite sides of the front nose portion facilitate gripping. Spring-biased pins at opposite ends of the roller assembly engage bores in the body and make it readily attachable and detachable. An upstanding, outwardly concave fillet extends along a clearance space between the body and roller assembly to prevent snagging a rider's clothing.

5 Claims, 7 Drawing Figures

U.S. Patent    May 5, 1987    4,662,677
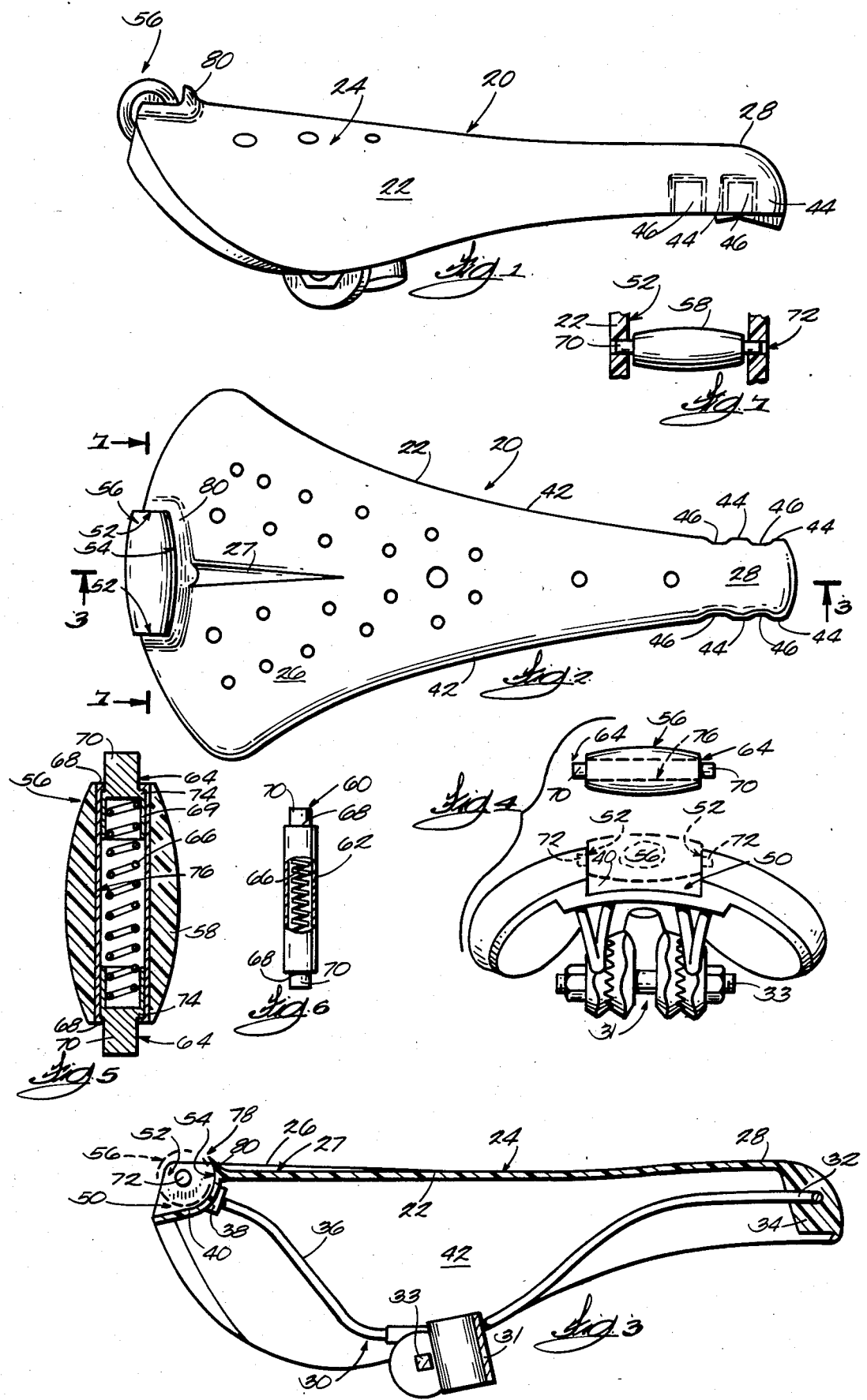

SADDLE FOR BICYCLE USED IN PERFORMING FREESTYLE MANEUVERS

BACKGROUND OF THE INVENTION

This invention relates to improvements in a sports bicycle called a Freestyle or Freestyle BMX Bike. These bikes have a low profile with wheel diameters of twenty inches or less and are extremely rugged. They are used in a variety of competitions and exhibitions including sprinting, racing, and trick maneuvers such as climbing an inclined ramp at high speed and dropping to a track below, riding or balancing while tilted upright on the rear wheel, and riding or coasting while the rider is seated or standing on the handlebar crossbar, or on various steps, extensions, or platforms on the frame, beneath the saddle, on the chain stays, on the seat stays, and on the front fork.

These maneuvers involve a great deal of skill and concentration, and a superlative sense of balance and timing. One of the most spectacular of these maneuvers is illustrated in a fifteen-frame sequence on pages 62 and 63 of the June, 1986 issue of *FREESTYLIN'* Magazine. Mid-way through the sequence, as shown in frames numbered 9, 10, and 11, the bicycle is completely upside down supported momentarily on the pavement by the ends of the handlebars and the rear, upper edge of the saddle. This scuffs and abrades the rear edge of the conventional saddle and momentarily restricts movement of the bike.

SUMMARY OF THE INVENTION

The principal object of this invention is to provide a bicycle saddle with a protecting element along the rear edge above the top surface to engage the pavement when the bicycle is in inverted or upside down position on pavement during freestyle maneuvers.

Another object is to provide a "live" protecting element in the form of a roller assembly to enable freestyle maneuvers while the bike is inverted with the seat contacting the pavement, without scuffing the seat.

Another object is to provide such a roller assembly to enable controlled movement of the bike on the pavement even during the transition into and out of a fully inverted position during a sequence of freestyle maneuvers.

Another object is to provide such a roller assembly which is readily assembled and removed for replacement.

Another object is to provide such roller means in a recess in the saddle body with opposite, coaxial, external pins engaged in bores formed in the body at opposite sides of the recess, and spring means biasing the pins outwardly to facilitate assembly within and disassembly from the recess.

Another object is to provide such a bicycle saddle in which opposite sides of the front portion have corrugated surfaces to facilitate gripping during freestyle maneuvers.

Another object is to provide such a bicycle saddle with the roller assembly positioned in a recess in the rear portion of the body, with the recess suitably oversized with respect to the roller means to provide a clearance therebetween, and an upstanding fillet extending along the clearance to deflect a rider's clothing and prevent snagging.

BRIEF DESCRIPTION OF THE DRAWINGS

Other objects and advantages will be apparent from the following description in connection with the appended drawings in which FIG. 1 is a side view of a bicycle saddle illustrating one form of the present invention;

FIG. 2 is a top view thereof;

FIG. 3 is a fragmentary, vertical cross-sectional view of FIG. 2 taken on line 3—3 with the roller shown in broken lines;

FIG. 4 is a rear, exploded view of FIGS. 1 or 2 showing the roller separated from the body in solid lines; and showing the roller journaled in the body in broken lines;

FIG. 5 is an enlarged longitudinal cross-sectional view of the roller assembly shown in the previous views;

FIG. 6 is a partially cut away view of a pintle subassembly forming part of the roller assembly; and FIG. 7 is a fragmentary cross-sectional view of FIG. 2 taken on line 7—7.

DETAILED DESCRIPTION OF THE PREFERRED EMBODIMENT

Referring now to the specific embodiment of the invention shown in the drawings, a bicycle saddle is generally designated 20. It has a body 22 of plastic or other suitable material with a top surface 24 contoured to support a rider. It has a relatively wide rear portion 26 with a longitudinal groove 27 and a relatively narrow front nose portion 28.

Referring to the inner portion of the saddle shown in FIG. 3, a conventional metallic frame consisting of a generally V-shaped, heavy steel rod 30 has a front apex 32 secured in a boss 34 molded into the nose portion, and a pair of rear legs 36 (one of which is shown) secured in bosses 38 molded into opposite sides of the rear wall 40. A conventional saddle clamp 31 with bolt 33 connects the rods 36 to a seat post (not shown). Curved sidewalls 42,42 extend toward the nose where they are externally corrugated to provide a plurality of vertical ribs 44 and grooves 46 to facilitate gripping by a performer during freestyle maneuvers.

Another important part of the present invention is a protecting element along the rear edge protruding above the top surface to engage the pavement when the bicycle is inverted during freestyle maneuvers. This protecting element as shown here is "live" comprising a roller assembly 56 details of which will now be described.

The saddle has a rearwardly-open, upper recess 50 above the rear wall 40 defined by side margins 52,52 and a forward margin 54.

The roller assembly 56 comprises a barrel-shaped roller 58 of plastic material such as nylon, and a pintle sub-assembly 60, all supported in the recess 50.

The pintle sub-assembly 60 (FIGS. 5 and 6) is preferably made of metal and comprises an outer, tubular sleeve 62, a pair of pins 64, and a compression spring 66. The sleeve 62 has a pair of internal end flanges 68 acting as stops limiting outward movement of the pins. Each pin has an inner cup portion 69 retaining the corresponding end of the spring 66, and a reduced-diameter external portion 70. When assembled, the end portions 70 are rotatably journaled in bores 72 in the saddle body at each side of the recess 50. The spring 66 urges the pins 64 outwardly to positions shown in FIGS. 5 and 6 where shoulders 74 on the pins are stopped by the flanges 68.

The roller 58 is formed with a longitudinal bore 76 and the pintle sub-assembly 60 is assembled into it by a press fit holding the sleeve 62 frictionally engaged within it. If desired, the outer surface of sleeve 62 may be knurled to enhance the frictional fit.

The roller 58 protrudes above the top surface of the saddle in position to engage pavement and protect the top rear edge from scuffing and abrasion damage when the bicycle is fully inverted, in upside down position, while performing freestyle maneuvers. Additionally, the roller provides a "live" support where the saddle contacts the pavement enabling controlled movement of the bicycle by a rider during a momentary transition to and from the fully inverted position.

Assembly of the roller assembly 56 into the seat body is carried out simply by compressing the pins into the sleeve 62 against the spring to an overall dimension less than the width of the recess 50. When the roller is moved into the proper position, with the pins 64 aligned with the bores 72,72, the spring will snap the pins outwardly into tamperproof, rotatably journaled engagement with the bores.

As best shown in FIGS. 2 and 3, a clearance 78 is provided between the surface of roller 58 and the side and front margins of the recess 50. To prevent a rider or his clothing from being caught or snagged in that recess, the top surface is formed with an upstanding concave fillet 80 which extends laterally along the margins 52 and 54 of the recess.

As best shown in FIG. 7, the bores 72 may have open ends opposite the roller 58 to facilitate removal of the roller assembly. By inserting tools in the open ends, the pin and sections 70 can be pressed into the roller body so the latter can be removed from the recess 50.

The invention described and shown has been necessarily specific for purposes of illustration. Alterations, extensions, and modifications which would be apparent to those skilled in the art are intended to be included in the appended claims. For example, while the protective element is illustrated as a particular form of roller, other forms of rollers, or even rotatable protective elements extending above the top surface of the saddle may be used as alternatives.

The embodiments of the invention in which an exclusive property or privilege is claimed are defined as follows:

1. A bicycle saddle having a body with a top surface contoured to support a rider, a relatively wide rear portion and a relatively narrow front nose portion, the improvement comprising:

a rotatable protecting element supported along the rear edge protruding above the top surface to engage the pavement when the bicycle is inverted on pavement during freestyle maneuvers.

2. In a bicycle saddle having a body with a top surface contoured to support a rider, a relatively wide rear portion and a relatively narrow front nose portion, the improvement comprising:

roller means rotatably journaled in a recess in the rear portion and extending above the top surface to engage pavement when the bicycle is inverted on pavement during freestyle maneuvers.

3. In a bicycle saddle, the improvement of claim 2 in which said roller means has opposite, coaxial external pins engaged in bores formed in the body at opposite sides of the recess, and spring means in the roller means biasing said pins outwardly to facilitate assembly of said roller means within and disassembly from said recess.

4. In a bicycle saddle, the improvement of claim 2 in which opposite sides of the front nose portion have corrugated surfaces to facilitate gripping during freestyle maneuvers.

5. In a bicycle saddle, the improvement of claim 2 in which said recess is suitably oversized with respect to the roller means to provide a clearance therebetween, and the top surface has an upstanding concave fillet extending along the clearance to deflect a rider's clothing and thereby prevent snagging.

* * * * *